(12) United States Patent
Sawada et al.

(10) Patent No.: US 6,232,738 B1
(45) Date of Patent: May 15, 2001

(54) VERTICAL AXIS TRANSLATION MECHANISM

(75) Inventors: Kiyoshi Sawada, Shizuoka; Akira Yamamoto, Yamanashi, both of (JP)

(73) Assignee: Fanuc, Ltd., Yamanashi (JP)

(*) Notice: Subject to any disclaimer, the term of this patent is extended or adjusted under 35 U.S.C. 154(b) by 0 days.

(21) Appl. No.: 09/456,543

(22) Filed: Dec. 8, 1999

(30) Foreign Application Priority Data

Dec. 10, 1998 (JP) .................................................. 10-368463

(51) Int. Cl.[7] ...................................................... B64C 17/06
(52) U.S. Cl. .......................... 318/649; 318/560; 409/202; 74/89.15; 264/1.34
(58) Field of Search .................................... 318/649, 560; 409/202; 74/89.15; 264/1.34

(56) References Cited

U.S. PATENT DOCUMENTS

| 5,468,101 | * | 11/1995 | Shoda | ..................................... | 318/649 |
|---|---|---|---|---|---|
| 5,669,866 | * | 9/1997 | Junlian et al. | ......................... | 318/649 |
| 6,110,401 | * | 8/2000 | Lee et al. | ............................. | 264/1.34 |

\* cited by examiner

*Primary Examiner*—Karen Masih
(74) *Attorney, Agent, or Firm*—Staas & Halsey LLP

(57) ABSTRACT

A plurality of electrostrictive elements 30 are located about the perimeter section of a table 2. The table is fixed to a table fixing member 3. The table fixing member 3 is prohibited from rotating by guide pins 19. When a servo motor 4' constituting a rotational drive mechanism 4 is driven by passing a current through a stator 6 therein, the rotor 7 rotates. Thereby, the table fixing member 3, which has a female screw thread 10 that engages with a male screw thread 9 formed in the rotor 7, moves in a vertical direction. The table 2 also moves in a vertical direction and can be registered in a desired position. Inclination of the table 2 caused by processing errors in the male screw 9 and female screw 10 is adjusted to a horizontal position or a desired angle, by driving the electrostrictive elements 30.

11 Claims, 4 Drawing Sheets

VERTICAL AXIS TRANSLATION MECHANISM

BACKGROUND OF THE INVENTION

1. Field of the Invention

The present invention relates to improvements in a vertical axis translation mechanism for driving a table in a vertical direction.

2. Description of the Related Art

With the increasing precision and increasingly high level of integration in optical devices, electronic devices, and the like, in recent years, precision in the order of nanometres is required in the components constituting such devices. Therefore, accuracy of extremely high resolution is required in the machine tools, steppers, electron beam drawing devices, and the like, used to process these high-precision components. Generally, it is common for such positioning devices to be controlled by CNC-controlled rotating servo motors or linear motors, and in many machine tools, known as ultra high precision processing machines, for processing the aforementioned high-precision components, high-resolution servo motors are used, in particular, and furthermore, air bearings are used for the guide surfaces.

Generally, in a machine tool, such as a machining device, a tool is attached to a spindle, and work carried on a table is cut by causing the tool to rotate. In this case, in order to perform infeed cutting into the work, a vertical axle is required in order to move the table linearly in a vertical direction to the table. Usually, a spindle head is caused to move vertically by attaching a movable slide to a guide fixed to the column, or the like. In this structure, the weight of the spindle, the motor and other components for driving this spindle is supported by the column itself, and since the column has a cantilevered structure, flexing of the column is liable to occur, thereby leading to a decline in manufacturing precision. For this reason, such a mechanism is not suitable for ultra high precision machines for processing ultra high precision components.

Therefore, in an ultra high precision processing machine, the spindle to which the tool is attached is fixed and is not capable of vertical movement, and a vertical axis translation mechanism is provided for performing infeed cutting operations by causing the table carrying the work to move in a vertical direction. For example, Japanese Patent Application Laid-open No. 86026/1998 discloses a vertical axis translation mechanism for causing a table to move in a vertical direction, directly by means of a driving motor, via a large-diameter feed screw.

This vertical axis translation mechanism has a merit in that the weight on the table is transferred directly to the full circumference of the feed screw, and hence the mechanism does not assume a cantilever state and it is capable of extremely fine positioning without receiving any offset weight effects. However, this mechanism does involve a problem in that the table surface may slope, depending on the movement position of the table, and be impossible to maintain in a horizontal attitude, due to the manufacturing accuracy of the screw and nut in the feed screw mechanism. In other words, it generates a yawing or pitching effect as seen generally in feeder mechanisms, whereby the table surface oscillates as the table moves vertically. Therefore, the table is held in an inclined state when it is positioned, causing processing accuracy to fall.

Generally, in a machine tool, the straightness of the movable slide has a great effect on the accuracy of the shape of the machined item. In a slide for a machine tool having a feed screw mechanism, the machining precision of the feed screw and nut as well as the accuracy of the shape of the guide surface influence the accuracy of movement of the slide, and these factors, drawing together, affect the straightness of the machine tool. In an ultra high precision machine tool as described above, this effect is particularly notable, and since the straightness of the machine tool is reflected directly in the machining precision when machining items requiring a very high degree of finishing precision, yawing and pitching of the kind described above occurs due to the machining precision of the feed screw and nut, with the result that the table cannot be held in a horizontal attitude when it is positioned, and hence the precision of the machined shape is liable to decline.

In an ultra high precision machine tool, an air bearing is often employed in order to raise machining precision. The invention disclosed in the aforementioned Japanese Patent Application Laid-open No. 86026/1998 is a vertical axis translation mechanism which uses a static pressure air screw type translation motor based on a large diameter screw. In a feeder mechanism using a static pressure air screw, slight oscillations occur in the nut as it moves along the screw, due to manufacturing errors in the screw and nut, unevenness in the air bearing gap, and the like, and hence even in a vertical axis translation mechanism using a static pressure air screw of this kind, the table surface may be inclined when the table is positioned, hence causing machining accuracy to decline.

Moreover, in a machine tool using a feed screw mechanism, there are errors in the pitch between each revolution of the screw. In an ultra high precision machine tool having a static pressure air screw, as described above, such errors are slight, but they still exist. Conventionally, a method is adopted whereby previously measured pitch errors are stored as pitch error compensating data in a memory inside the control device, and the pitch error compensation is performed accordingly during the positional control process. However, in the aforementioned vertical axis translation mechanisms, the table may be inclined, and therefore it is very difficult to apply this compensating method.

SUMMARY OF THE INVENTION

It is an object of the present invention to provide a vertical axis translation mechanism for driving a table in a vertical direction, whereby the inclination and position of the table surface can be corrected.

The present invention is a vertical axis translation mechanism comprising: a servo motor containing a stator and a rotor positioned concentrically with respect to the stator; a table coupled via a table fixing member to the rotor of the servo motor; and movement direction restricting means, whereby screw thread sections provided respectively in the rotor and the table fixing member, in a concentric fashion, engage mutually and rotation of the table fixing member is prohibited whilst rotation of the rotor is converted to a feed movement in the axial direction of the table; wherein microdisplacement elements which cause the perimeter region of the table to move in a vertical direction are arranged between the perimeter region of the table and the table fixing member, so that the inclination of the surface of the table is adjusted by causing the microdisplacement elements to expand or contract in the axial direction.

In addition to enabling inclination of a table driven in the vertical direction by a vertical axis translation mechanism to be corrected such that the table surface lies parallel to a reference plane, the present invention also makes it possible to correct positioning errors. Moreover, it also enables positioning to be carried out to a very high degree of accuracy exceeding the resolution of a position detector in a vertical axis translation mechanism. Therefore, machining precision can be improved.

BRIEF DESCRIPTION OF THE DRAWINGS

The foregoing and other objects and features of the invention will become apparent from the following description of the preferred embodiments of the invention with reference to the accompanying drawings, in which.

DESCRIPTION OF THE PREFERRED EMBODIMENTS

Figure 1:
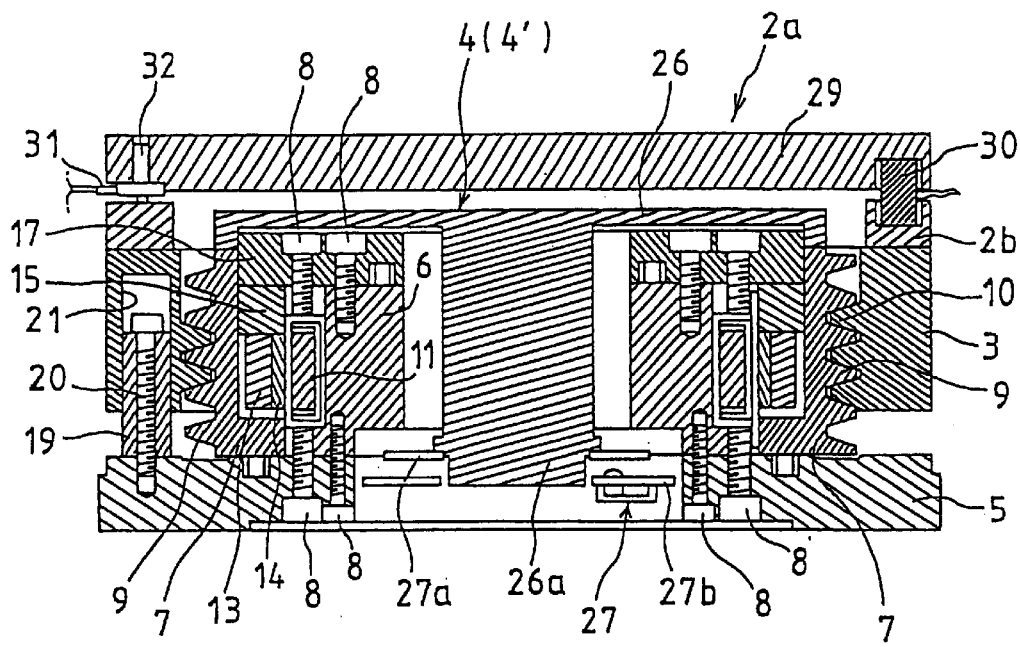
FIG. 1 is a sectional view of a vertical axis translation mechanism according to one embodiment of the present invention.

FIG. 1 is a sectional diagram giving an approximate view of the composition of an air bearing-type vertical axis translation mechanism 1 based on a large-diameter feed screw according to one embodiment of the present invention, said sectional view being cut along a horizontal plane containing the central axis of said mechanism.

This vertical axis translation mechanism 1 comprises a table fixing member 3 for fixing the table 2, a rotational drive mechanism 4 installed therein, a base 5 for attaching the rotational drive mechanism 4, and the like, and as FIG. 1 clearly shows, these members are formed by tubular or ring-shaped bodies.

The rotational drive mechanism 4 is constituted by a servo motor 4' provided with a stator 6 on the inner side thereof and a rotor 7 on the outer side thereof, the tubular stator 6 located on the inner side being fixed in an integral fashion to the base 5 by means of a plurality of bolts 8, in a position towards the inner side of the ring-shaped base 5. Moreover, the tubular rotor 7 is installed rotatably on the base 5 in such a manner that it surrounds the outer circumference of the stator 6, and a male screw thread 9 is provided on the outer circumference of the rotor 7, which is a rotating section, and engages with a female screw thread 10 provided on the inner circumference of the tubular table fixing member 3.

The stator 6, rotor 7 and table fixing member 3 are each formed in a tubular shape, as stated previously, each of these members being positioned in a concentric fashion, and a static pressure air bearing is provided on the sliding surface between the lower face of the rotor 7 and the base 5.

Moreover, a stator core 11 comprising a wound coil is attached in an integral fashion to the outer circumference of the stator 6, whilst a rotor core 13 and magnet 14 are incorporated in a portion of the inner circumference of the rotor 7 having an enlarged diameter and are fixed integrally to the rotor 7 by means of a ring-shaped spacer 15 which interlocks with the upper end of the aforementioned enlarged diameter section. A static pressure air bearing is provided between the outer circumference of the stator 6 and the inner circumference of the rotor 7.

Furthermore, a ring-shaped retainer 17 is fixed integrally to the upper end surface of the stator 6 by means of a plurality of bolts 8, and the air bearing provided between the lower face of the outer portion of the retainer 17 and the spacer 15 prohibits the movement of the rotor 7 in an axial direction.

Moreover, a rotation detector installation member 26 formed by a rotating member having an approximately T-shaped cross-section is fixed to the upper end surface of the rotor 7 in such a manner that it covers the retainer 17 in the radial direction thereof, and an encoder disk 27a, or the like, forming a constituent element of a pulse encoder 27, is fixed to the end of a projecting section 26a projecting in a downward direction from the central portion of the rotation detector installation member 26. Moreover, symbol 27b denotes a base plate to which a photocoupler, or the like, forming a constituent element of the pulse encoder 27, is affixed, and this base plate 27b is fixed directly to the central portion of the base 5.

As illustrated in FIG. 1, a guide pin 19 fixed to the base 5 by a bolt 20 is provided at three points separated respectively by a pitch of 120° about the outer circumference of the base 5, which has a ring-shaped form. Moreover, a hole 21 with which a guide pin 19 engages is provided respectively at positions in the table fixing member 3 which correspond to the guide pins 19, and the combination of the guide pin 19 and the bolt 20 constitutes movement direction restricting means for restricting the direction of movement of the table fixing member 3 with respect to the base 5. Since a static pressure air bearing is formed between each of the guide pin 19 and the holes 21, the outer circumference of each guide pin 19 does not contact directly the inner circumference of the respective hole 21.

The foregoing composition is virtually the same as that of the vertical axis translation mechanism disclosed in Japanese Patent Application Laid-open No. 86029/1998, but the present invention differs from the conventional vertical axis translation mechanism in that microdisplacement elements, such as electrostrictive elements or magnetostrictive elements are incorporated inside the table 2. In the present embodiment, electrostrictive elements are used as the microdisplacement elements. As illustrated in FIG. 1, the table 2 is divided into a first table member forming a flat surface of the table 2 and a second table member 2b which couples the table 2 to the table fixing member 3. The first table member 2a and the second table member 2b are coupled by electrostrictive elements 30a1–30d2. Moreover, the second table member 2b is fixed to the table fixing member 3.

Figure 2:
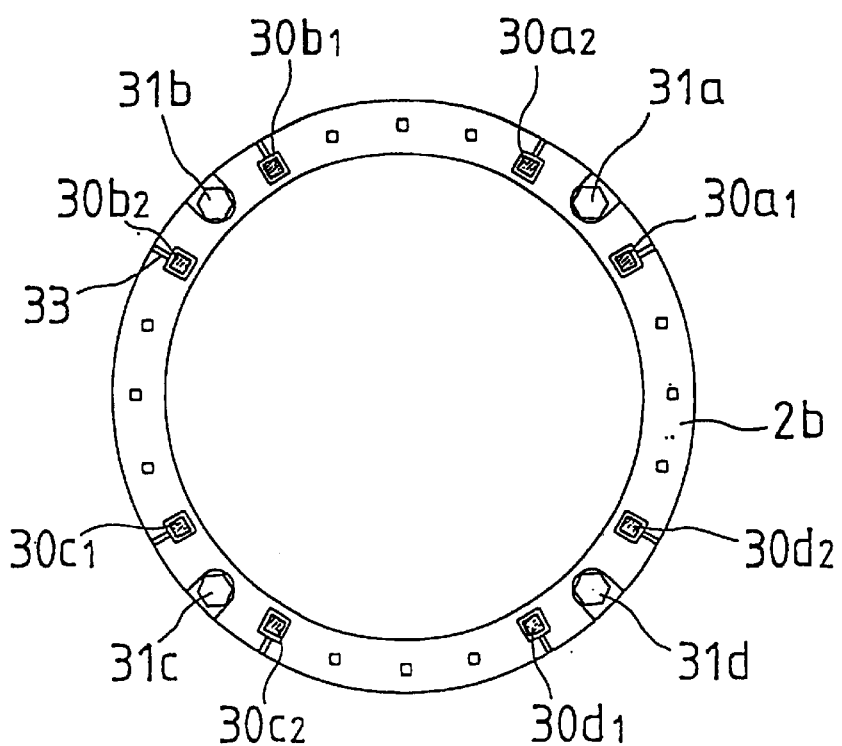
FIG. 2 is an illustrative diagram of the positional state of an electrostrictive element and a load cell in the same embodiment.

FIG. 2 shows a plan view of the table member 2b in a state where the first table member 2a has been removed and the electrostrictive elements 30a1–30d2 and load cells 31a–31d each of which serves as a force sensor as described hereinafter have been placed in position.

The four pairs of electrostrictive elements (in other words, electrostrictive elements 30a1 and 30a2, 30b1 and 30b2, 30c1 and 30c2, 30d1 and 30d2) are located equidistantly along the circumference of a circle having a centre at the central point of the table 2. Moreover, a load cell 31a, 31b, 31c, 31d is positioned respectively between the two electrostrictive elements forming each pair (in other words, between electrostrictive elements 30a1 and 30a2, 30b1 and 30b2, 30c1 and 30c2, 30d1 and 30d2). In other words, the load cells 31a–31d are placed equidistantly in four positions along the circumference of the circle on which the electrostrictive elements 30a1–30d2 are located.

As described later, a single feedback control system is constituted by a load cell and the pair of electrostrictive elements positioned on either side of the load cell. For example, a single feedback control system is formed by the load cell 31a and the pair of electrostrictive elements 30a1, 30a2 positioned on either side of that load cell 31a. (Consequently, a total of four feedback control systems are formed in the example in FIG. 2.)

According to the composition described above, if the servo motor 4' is driven by passing current from a servo amplifier to the stator coil, the rotor 7 will rotate about the stator 6, which is fixed to the base 5. On the other hand, the tubular table fixing member 3, which screws into the male screw thread 9 on the rotor 7 by means of the female screw thread 10 on the inner circumference thereof, performs vertical movement, since it is prevented from rotating by the guide pins, and hence an upward or downward motion is applied to the table 2.

Here, as described previously, cases may arise where the surface of the table 2 is inclined, due to the processing accuracy of the screw and nut in the screw mechanism, in other words, the processing accuracy of the male screw thread 9 formed on the outer circumference of the rotor 7 and the female screw thread 10 provided on the inner circumference of the table fixing member 3. Moreover, the direction of inclination of the table 2 may also vary depending on the movement position of the table 2.

The present invention is devised in such a manner that the table 2 can be maintained in an attitude parallel to a reference plane by correcting inclination of the table 2 by means of the electrostrictive elements 30a1–30d2. Therefore, as illustrated in FIG. 1, the electrostrictive elements 30a1–30d2 are located in a compressed state between the first and second table members 2a, 2b, in such a manner that they expand and contract in a vertical direction. Moreover, as also shown in FIG. 1, the load cells 31a–31d are positioned in such a manner that a pre-load is applied thereto from the side of the first table member 2a by means of pressure screws 32. In FIG. 2, reference numeral 33 denotes a groove for accommodating lead wires for supplying electric power to the electrostrictive elements 30a1–30d2.

Thereupon, the rotational drive mechanism 4 (servo motor 4') is driven, the table 2 is moved to a target position and positioned, and the drive to the rotational drive mechanism 4 is halted, whereupon two level meters are positioned orthogonally on the table 2, the inclination of the table 2 is measured, and the degree of contraction of the electrostrictive elements 30a1–30d2 is adjusted in such a manner that the table 2 lies parallel to a reference plane, in other word, a vertical plane perpendicular to the central axis.

Figure 3:
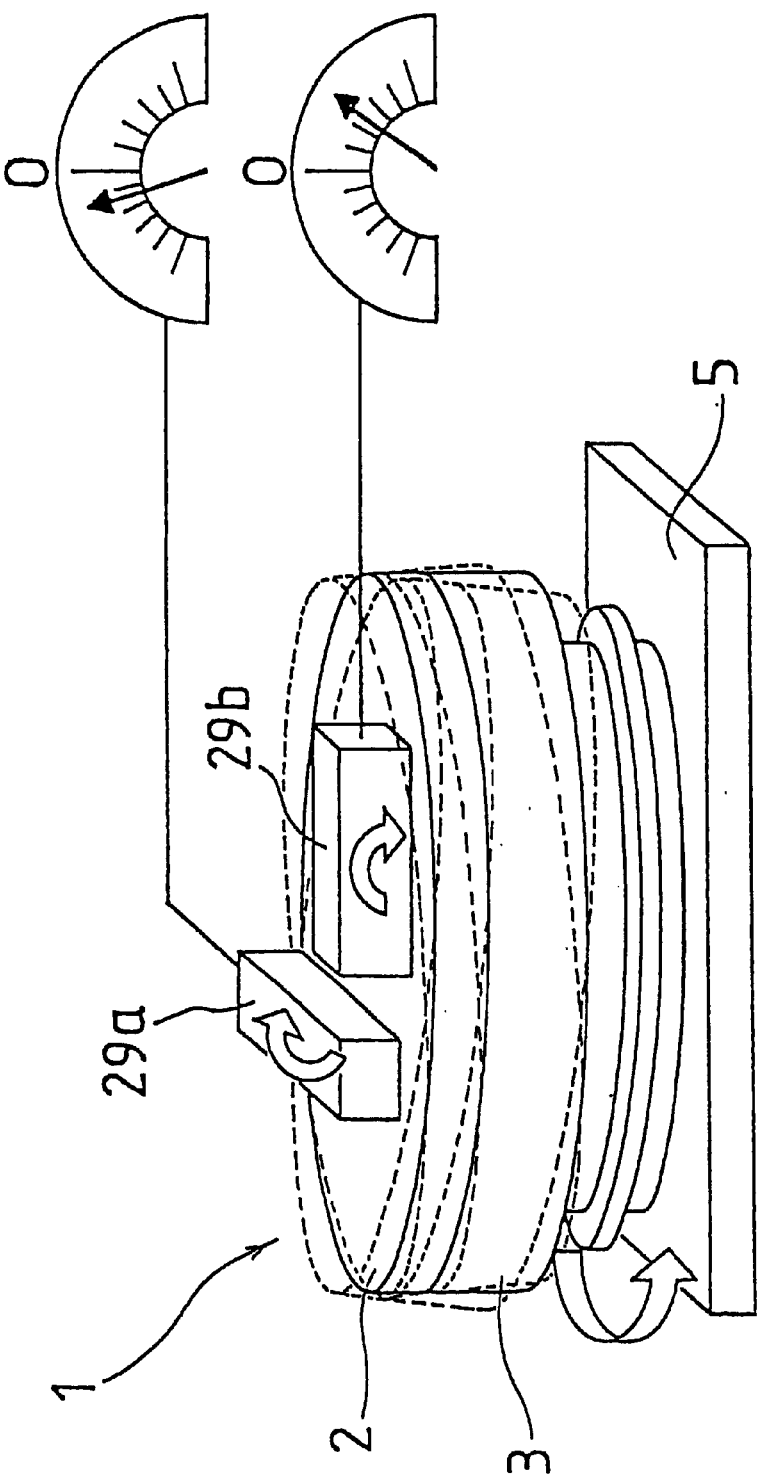
FIG. 3 is an illustrative diagram of a method for correcting the inclination of a table surface in the same embodiment.

FIG. 3 is an approximate diagram of the process of measuring the inclination of the table 2.

For example, one of the level meters 29a is placed on the straight line linking load cells 31a and 31c in FIG. 2, the other level meter 29b is placed on the straight line linking load cells 31b and 31d, and electrostrictive elements 30a1 and 30a2, or electrostrictive elements 30c1 and 30c2, are adjusted in such a manner that the level meter 29a reads "0", in other words, level. Furthermore, the electrostrictive elements 30b1 and 30b2 or electrostrictive elements 30d1 and 30d2 are adjusted in such a manner that the other level meter 29b reads "0", or level.

Figure 4:
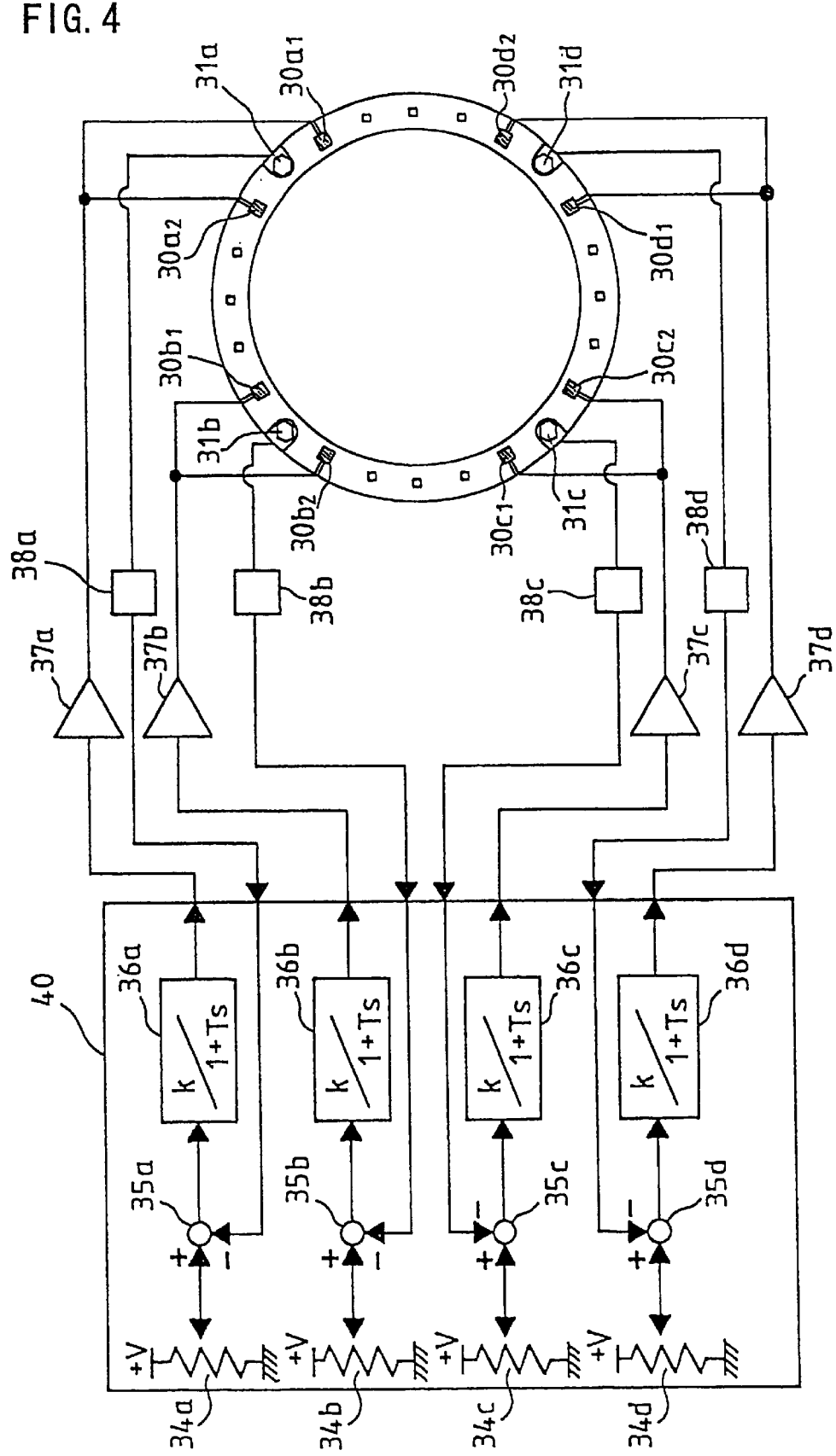
FIG. 4 is a block diagram showing the composition of feedback control systems in the same embodiment.

FIG. 4 is a block diagram of feedback control systems constituted respectively by load cells 31a–31d and electrostrictive elements 30a1–30d2.

The electrostrictive element control panel 40 is provided with volume controls 34a–34d for setting the target voltage supplied to electrostrictive elements 30a1–30d2, subtracters 35a–35d, and amplification calculators 36a–36d having a primary delay transmission function.

The outputs from the amplification calculators 36a–36d are supplied respectively via electrostrictive element drive amplifiers 37a–37d to the electrostrictive elements 30a1 and 30a2, 30b1 and 30b2, 30c1 and 30c2, 30d1 and 30d2, forming the respective pairs. The load cells 31a–31d are input respectively via distortion amplifiers 38a–38d to the subtracters 35a–35d.

In other words, a single feedback control system (first feedback control system) is formed by load cell 31a, electrostrictive elements 30a1 and 30a2, volume 34a, subtracter 35a, amplification calculator 36a, electrostrictive element drive amplifier 37a, and distortion amplifier 38a.

Similarly, a second feedback control system is formed by load cell 31b, electrostrictive elements 30b1 and 30b2, volume 34b, subtracter 35b, amplification calculator 36b, electrostrictive element drive amplifier 37b, and distortion amplifier 38b. Moreover, a third feedback control system is formed by load cell 31c, electrostrictive elements 30c1 and 30c2, volume 34c, subtracter 35c, amplification calculator 36c, electrostrictive element drive amplifier 37c, and distortion amplifier 38c. Furthermore, a fourth feedback control system is formed by load cell 31d, electrostrictive elements 30d1 and 30d2, volume 34d, subtracter 35d, amplification calculator 36d, electrostrictive element drive amplifier 37d, and distortion amplifier 38d.

Describing the operation of these feedback control systems with reference to the first feedback control system, the volume 34a is adjusted according to the inclination of the table 2 as measured by the level meters, and a target voltage is input to the subtracter 35a. The subtracter 35a subtracts the voltage output by the distortion amplifier 38a from the target voltage input via the volume 34a to determine a voltage deviation, and this voltage deviation is then amplified by the amplification calculator 36a and passed through the electrostrictive element drive amplifiers 37a, thereby driving the two electrostrictive elements 30a1 and 30a2. Consequently, feedback control is carried out in such a manner that the output voltage from the distortion amplifier 38a matches the target voltage set by the volume 34a, and therefore electrostrictive elements 30a1 and 30a2 expand or contract in accordance with the target voltage, thereby driving the first table member 2a in the table 2 and changing the inclination of the table surface.

The other three feedback control systems operate in a similar fashion, and each of the volumes 34a–34d is adjusted according to the inclination of the table surface as measured by the level meters 29a, 29b, the table surface being adjusted such that it is parallel with a reference plane by causing the respective electrostrictive elements 30a1 and 30a2, 30b1 and 30b2, 30c1 and 30c2, 30d1 and 30d2, to expand or contract.

As described above, by driving the vertical axis translation mechanism 4 (servo motor 4'), positioning the table 2 at the target position, and driving the electrostrictive elements 30a1–30d2 such that the table is adjusted until it is parallel with a reference plane, any inclination of the table 2 arising from the processing accuracy of the screw section in the vertical axis translation mechanism can be corrected.

Moreover, if seeking to position the table with a precision exceeding the positioning error caused by pitch error in the male screw thread 9 and female screw thread 10 of the vertical axis translation mechanism constituting the feed screw, and a precision exceeding the resolution of the pulse encoder 27 attached to the vertical axis translation mechanism 4 (servo motor 4'), then after deriving a flat table surface with respect to the reference plane by adjusting the inclination of the table 2 by means of the aforementioned method, the upper surface of the table is measured by means of laser interferometry, or the like, to determine the amount of correction required to offset the displacement error from the target stop position, the volumes 34a–34d are adjusted, and all of the electrostrictive elements 30a1, 30a2–30d1, 30d2, are displaced by the aforementioned amount of correction, moving the table until the surface comes to a attitude parallel to the reference plane, and thereby making it possible to position the table at a target position with a very high degree of accuracy.

Moreover, in addition to adjusting the table surface such that it is parallel to the reference plane, it is also possible to adjust the table in such a manner that the table surface is purposely made to incline with respect to the reference plane, within the expansion stroke range of the electrostrictive elements 30a1, 30a2–30d1, 30d2.

Figure 5:
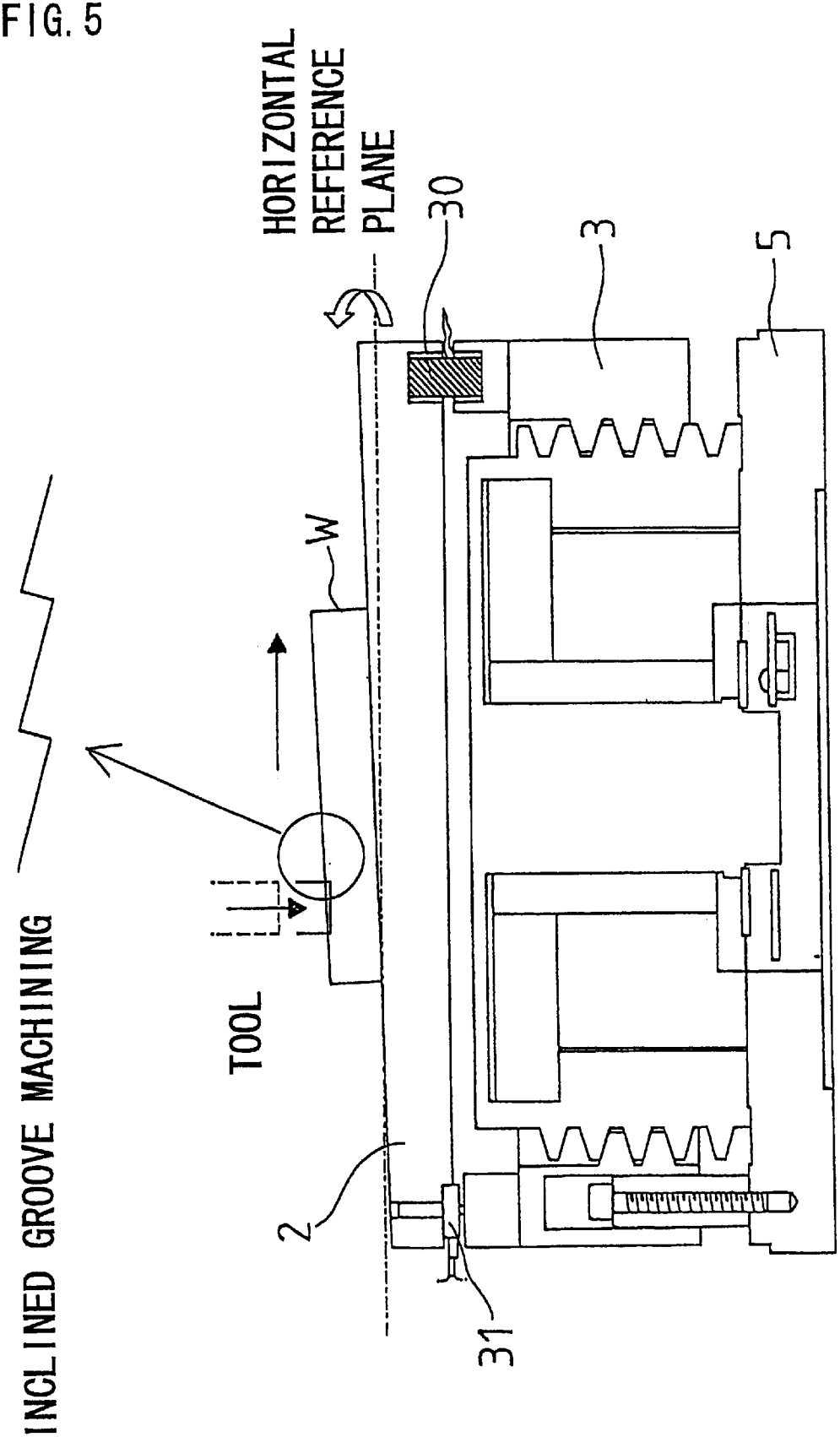
FIG. 5 is an illustrative diagram of inclined groove machining whereby machining is carried out whilst the table is inclined at an angle in the same embodiment.

As illustrated in FIG. 5, by adjusting the degree of expansion or contraction of the various electrostrictive elements, it is possible to cause the upper surface of the table 2 to incline at a prescribed angle from the horizontal reference plane, thereby enabling an inclined groove to be processed as shown in FIG. 5 in a workpiece W installed on the table 2.

In the embodiment described above, the table 2 is divided into a first table member 2a and a second table member 2b, the electrostrictive elements 30a1–30d2 being positioned between these two table members, but it is also possible to provide electrostrictive elements 30a1–30d2 between the table 2 and table fixing member 3, without the table 2 being divided, in such a manner that the table 2 and the table fixing member 3 are coupled via the electrostrictive elements.

Moreover, in the embodiment described above, feedback control was used as drive control means for the electrostrictive elements, but it is not necessary to implement feedback control, and open control may also be employed. In this case, power sensors for the load cells, and the like, are not necessary, and the expansion and contraction of the electrostrictive elements should be controlled by inputting target voltages set by volumes, or the like, to the electrostrictive element drive amplifiers.

What is claimed is:

1. A vertical axis translation mechanism comprising: a servo motor containing a stator and a rotor positioned concentrically with respect to the stator; a table coupled via a table fixing member to the rotor of said servo motor; and movement direction restricting means by which screw thread sections provided respectively in said rotor and said table fixing member, in a concentric fashion, engage mutually to prohibit rotation of said table fixing member and rotation of said rotor is converted to a feed movement in the axial direction of said table;

wherein microdisplacement elements which cause the perimeter region of said table to move in a vertical direction are arranged between the perimeter region of the table and said table fixing member, so that the inclination of the surface of the table is adjusted by causing said microdisplacement elements to expand or contract in the axial direction.

2. The vertical axis translation mechanism according to claim 1, wherein the inclination of the table surface at a desired position in the direction of the vertical axis is corrected by means of said microdisplacement elements.

3. The vertical axis translation mechanism according to claim 1, wherein the inclination of the table is corrected by means of said microdisplacement elements so that the surface of the table is parallel to a reference plane which makes a predetermined angle to the vertical axis, at any position in the direction of the vertical axis.

4. The vertical axis translation mechanism according to claim 1, wherein any desired inclined surface is obtained by compulsorily inclining the table surface to a very slight degree, by means of said microdisplacement elements.

5. The vertical axis translation mechanism according to claim 1, wherein said microdisplacement elements are electrostrictive elements.

6. The vertical axis translation mechanism according to claim 1, wherein said vertical axis translation mechanism uses static pressure air screws.

7. A table translation mechanism comprising:

a feed screw mechanism consisting of a screw thread formed in the outer circumference of a rotating mechanism which rotates about an axis and a screw thread formed in the inner circumference of a table fixing member;

a table, affixed to said table fixing member by means of a plurality of elements capable of very small amounts of deformation in response to an input value;

table inclination measuring means for measuring the direction of inclination and the amount of inclination of said table with respect to a reference plane;

amount of inclination calculating means for calculating input values to be supplied to each of said elements in order to make said table lie parallel with respect to said reference plane, from the measurement output of said measuring means;

wherein said table fixing member is caused to move in said axial direction, without rotating about said axis, by means of said rotating mechanism being driven in rotation.

8. The table translation mechanism according to claim 7, wherein said rotating mechanism is an electric motor.

9. The table translation mechanism according to claim 7, wherein said elements are electrostrictive elements.

10. The table translation mechanism according to claim 7, wherein said table inclination measuring means comprises at least two level meters positioned on said table in a manner such that they make an angle of 90°.

11. The table translation mechanism according to claim 7, further comprising table position measuring means for measuring the position of said table in said axial direction; and movement amount calculating means for measuring the position of the table in said axial direction after said table has been made to lie parallel to the reference plane by said table inclination measuring means, and calculating input values to be supplied to each of said elements in order to move said table to a desired position, from the measurement output.

* * * * *